Patented Oct. 24, 1933

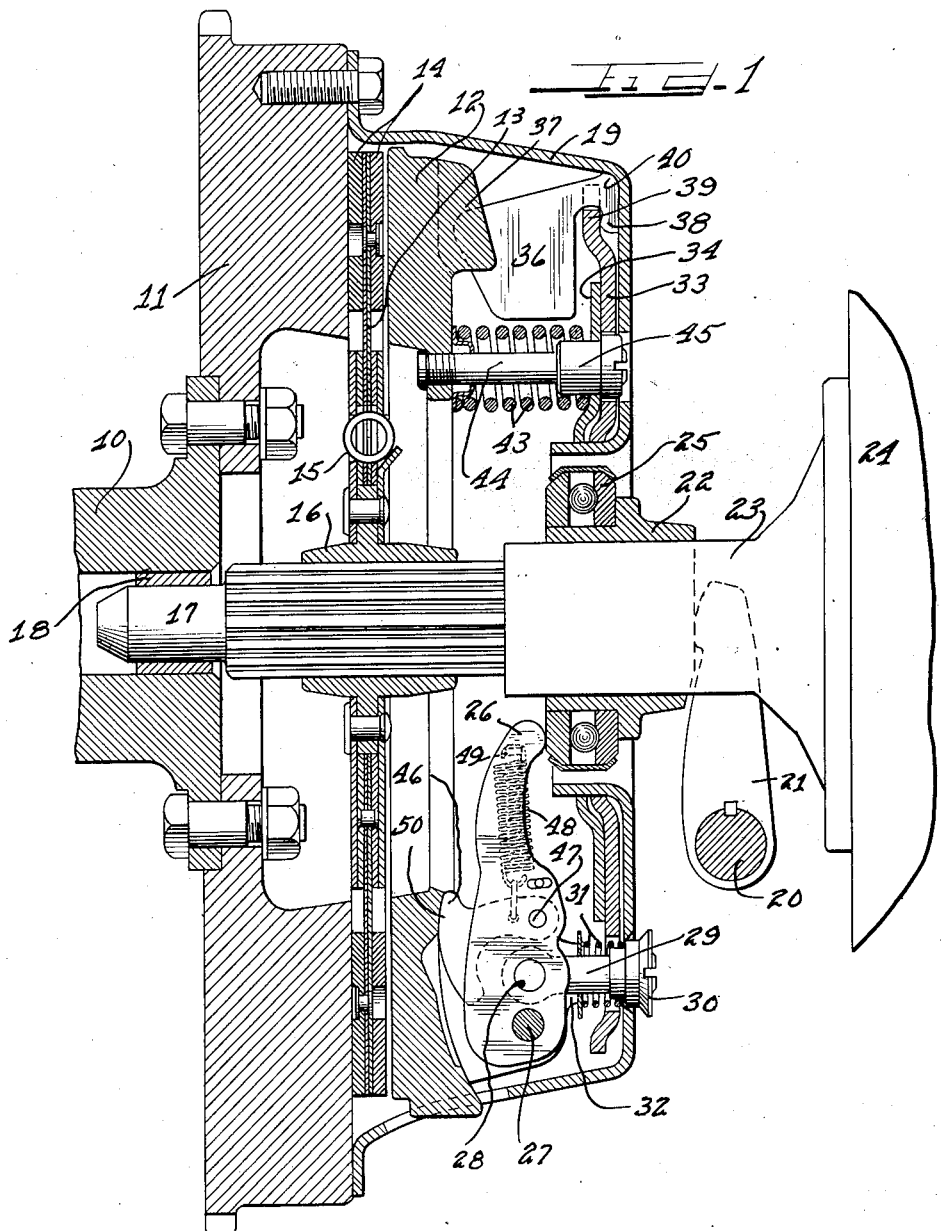

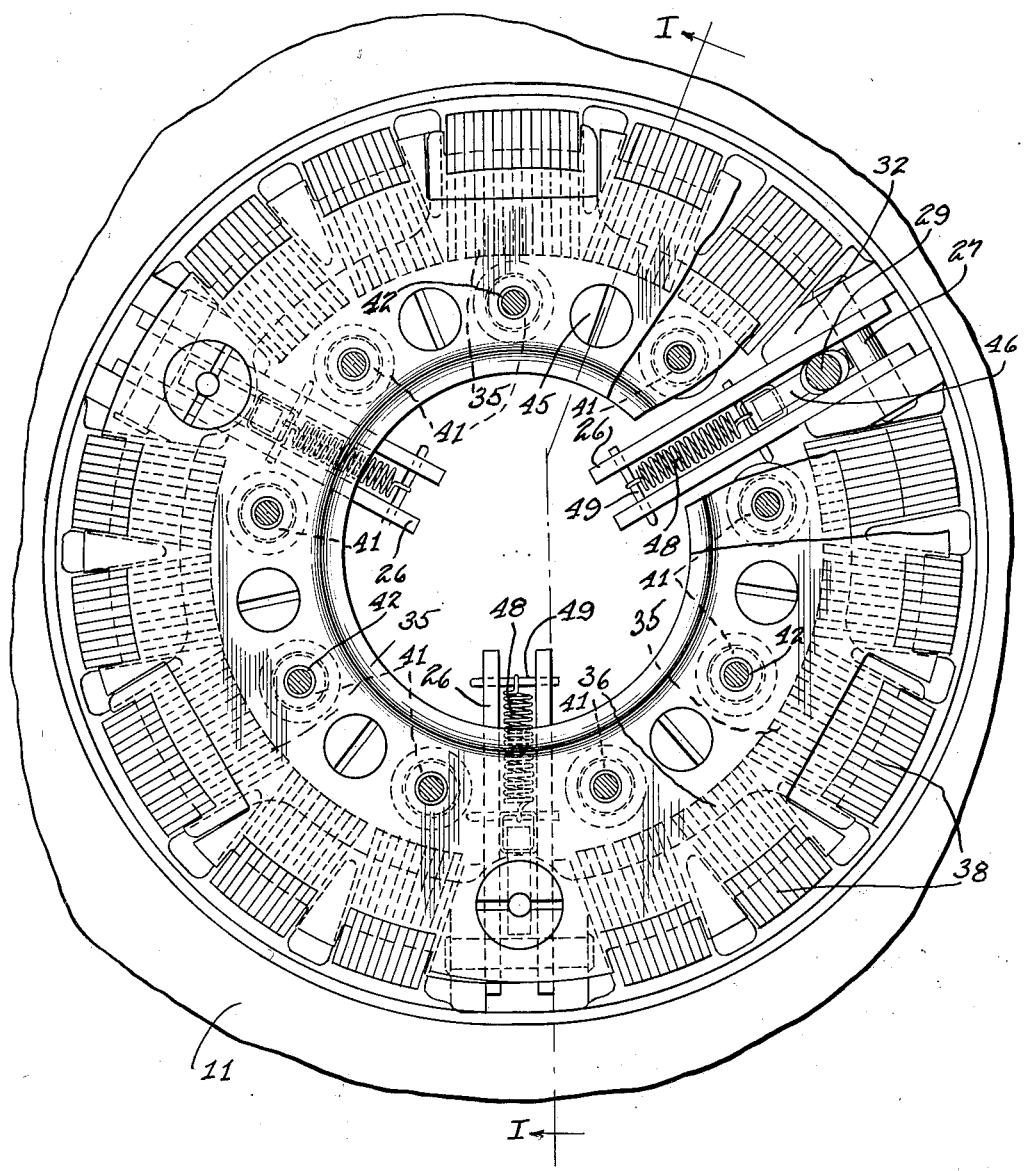

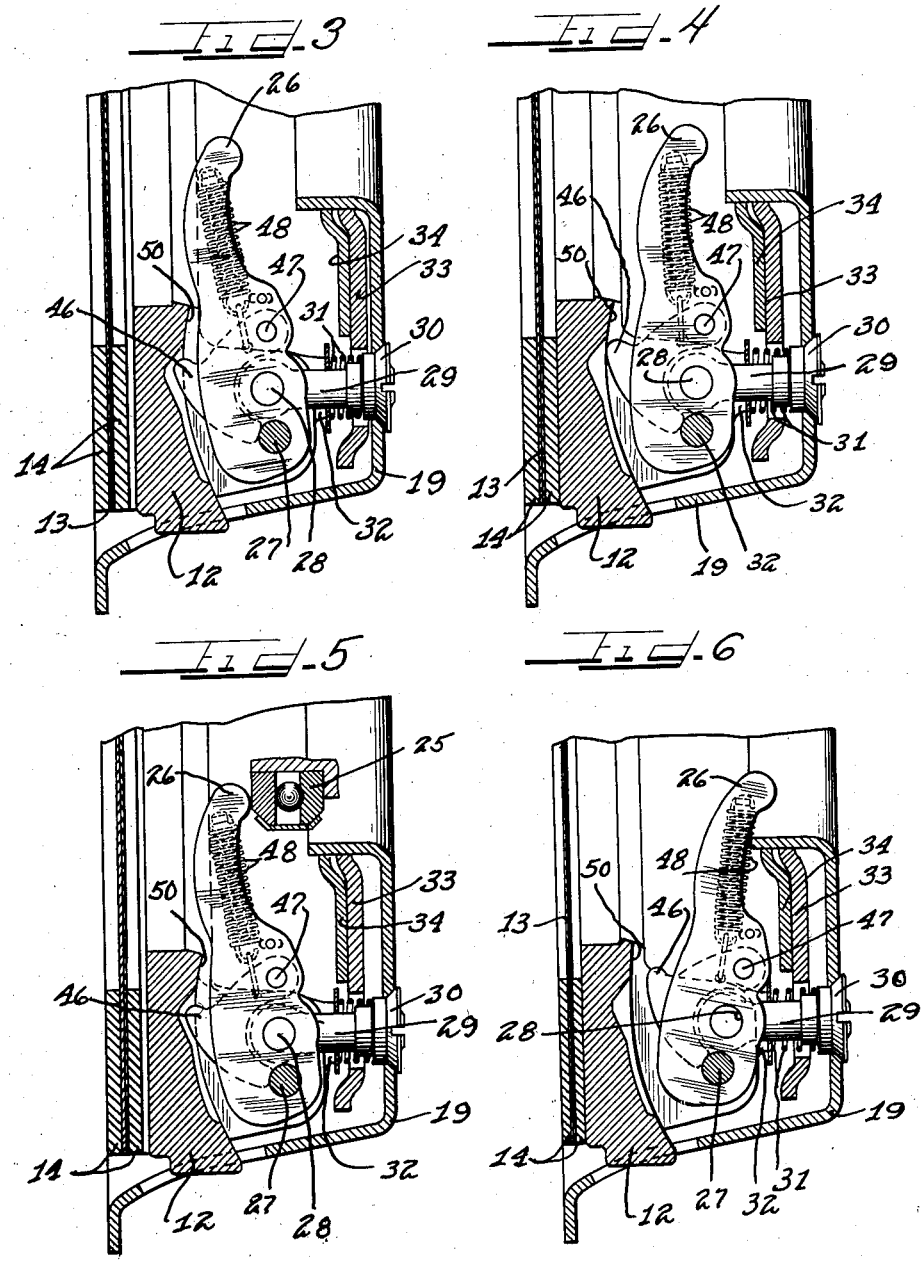

1,931,675

UNITED STATES PATENT OFFICE 1,031,675

AUTOMATIC CLUTCH LOCK-OUT DEVICE

Harold Nutt, Chicago, Ill., assignor to The Borg & Beck Company, Chicago, Ill., a corporation of Illinois Application March 24, 1932. Serial No. 600,851

19 Claims. (Cl. 192—105)

This invention relates to automatically operating clutches wherein a driving member automatically picks up the load of a driven member upon reaching a predetermined rotative speed. For the purposes of this invention the particular type or mechanism by which engagement is secured is of relatively slight importance since my invention has to do with overcoming a defect inherent in types of clutches which automatically engage at or above a predetermined rotative speed.

In automatic clutches designed to engage after a predetermined rotative speed has been reached it is obviously impossible to reverse the direction of power transmission to enable the normally driven member to pick up and start the normally driving member should that be desirable. As one example an automotive vehicle clutch has been chosen to illustrate one embodiment of this invention since in such service it is frequently desirable to be able to engage the clutch positively at the will of the driver should the engine have stopped or have failed to start in the usual manner. In an automatic clutch of the type described it thus becomes necessary to provide some means for engaging the clutch when the engine has stalled, during a period of free wheeling for example, so that the engine may be cranked by the momentum of the vehicle. This condition is often also experienced in cold weather when one vehicle can conveniently be used to push another in order to crank the engine of the latter when the battery has been run down. It is also desirable to provide some means of engaging the clutch, if the engine stalls when descending a hill with the clutch already disengaged. Since a clutch of the type mentioned operates automatically at predetermined rotative speeds of the driving member it also disengages automatically when the engine speed is slow or when it stops and this invention is directed to means whereby the engine can be picked up by the vehicle at the will of the operator.

It is a further object of this invention to provide such an automatic lockout or pickup for manually engaging the clutch wherein wear of the clutch engaging members is compensated for by a follow up or cam like action for taking up the increasing clearances produced by clutch wear.

It is also an important object of this invention to provide an improved combined clutch throw-out and engaging mechanism that will be automatically thrown out of operating contact while the clutch is rotating but which is brought into contact to take up the varying clearances when the clutch rotates below a predetermined speed.

This invention will be illustrated and described as applied to a centrifugal type of clutch more fully described and claimed in my copending application, Serial No. 597,691 filed March 9, 1932, but it is to be understood that I do not limit my invention to such a type of automatic or automotive clutch.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal section through a clutch embodying the features of this invention, the section corresponding to the line I—I in Figure 2. In this view of the clutch the position of the various parts correspond to the automatically disengaged position when the engine is stopped.

Figure 2 is a plan or rear view of the clutch structure with the housing and driven shaft omitted and other parts broken away to more clearly disclose the clutch structure.

Figure 3 is a fragmentary detail section corresponding to the lower part of Figure 1 with the parts shown in the automatically released position when the engine or driver is idling.

Figure 4 is a fragmentary detail section similar to Figure 3 wherein the clutch parts are shown in the fully engaged position.

Figure 5 is a fragmentary detail section similar to Figure 3 wherein the clutch parts are shown as manually released above the normal engaging speed.

Figure 6 is a fragmentary detail section similar to Figure 3 wherein the clutch facings have worn down and the increased clearances have been taken up in the fully engaged position.

As shown:

The automotive type of clutch chosen to illustrate one embodiment of this invention is of the single plate type although it is to be understood that my invention is not to be limited in application to the particular combination of conventional elements disclosed. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc carries the usual facing material 14 on both sides and is yieldingly connected by springs 15 to an internally splined hub 16 to absorb torsional vibrations. A transmission drive shaft 17 which forms the driven shaft of the clutch is provided with splines on which the hub 16 slides and the shaft is journaled at its front end in a pilot bearing 18 axially located in the crankshaft. The pressure plate 12 and the operating mechanism therefor is enclosed in a casing or housing 19 bolted to the rear face of the flywheel.

The foregoing described structure is substantially the same as the well known Borg & Beck manually operated clutch wherein the pressure plate is urged against the clutch disc by spring pressure and is retracted by means of the usual clutch throwout lever acting on a shaft 20 having a fork 21 keyed thereto to shift a sliding collar 22 to the left on a sleeve 23 enveloping the transmission drive shaft 17 and secured to the transmission case 24. The collar 22 carries a thrust bearing 25 which contacts pairs of spaced throwout fingers 26 pivoted at 27 to the pressure plate and fulcrumed at 28 in an adjustable eye bolt 29 having a nut 30 seated in the housing. The eye bolts carry balancing springs 31 bearing against shoulders 32 on the pressure plate alongside the levers 26.

The adjusting nuts 30 normally seat against the housing 19 as shown in Figures 3 to 6 but are lifted away therefrom by the springs 31 when the clutch is released and the engine dead. The extent of the lift is sufficient to permit manual engagement of the clutch when the engine has stopped, without pivotal movement of the throwout fingers, as these fingers are then held rigidly relative to the pressure plate, as will hereinafter more fully appear.

The spring mounting rings or spiders are provided, an outer secondary ring 33 which is adjacent the inner surface of the clutch housing 19 when the clutch is disengaged as in Figure 1, and an inner primary ring 34 normally seated thereon. This is because two distinct stages of operation are provided in the disclosed clutch, the primary spring ring 34 shifting to the left in advance of the secondary ring at a predetermined rotative speed, followed by the secondary spring ring 33 at a higher rotative speed, the secondary ring thus supplementing the primary spring ring to provide full engagement after a predetermined increase in rotative speed.

The spring rings 34 and 33 are advanced to the left by separate groups of weights. As shown in Figure 2, three large groups of weights 35 act on the primary ring 34 while twelve groups of weights 36 act against the secondary ring 33. These weights are conveniently formed as a plurality of thin stampings guided between bosses 37 on the pressure plate and having extension lugs 38 hooked over the back of the spring ring 33 in notches 39 in the periphery thereof, the heel 40 of the lugs being rounded and fulcrumed or bearing in the fillet at the corner of the housing. The weights are not restrained or pinned otherwise than by the housing and spring ring, and swing outwardly about the heel as a pivot until they contact against the housing under the action of centrifugal force, the swinging movement causing the toe of the lugs 38 to pry the spring ring to the left.

The primary and secondary rings are normally urged to the right in the figures by separate sets of retractor springs 41 indicated in the plan view of Figure 2. These springs are provided to act against the primary ring 34, being located between the ring and nuts on bolts 42, the heads of which seat on the housing. The secondary ring 33 is similarly retracted by another set of these springs which springs are chosen of greater total strength than the primary retractor springs. Thus the secondary retractor springs exert considerably greater total pressure than the primary retractor springs and since both sets of springs resist the response of their associated weights the premary set of weights will respond to a lower rotative speed than the secondary set of weights. Since the spring forces are predetermined and can be varied by adjustments of the bolts and nuts, the slip range of the clutch, between initial and complete engagement can be varied within wide limits to suit the requirements of different installations.

It is to be noted that the retractor springs do not bear against the pressure plate, their sole function being to control the operation of the centrifugal weights and to move the spring rings to the right when the rotative speed drops below the predetermined speeds at which each ring operates.

A third group of springs 43 shown in the upper part of Figure 1 are interposed between the pressure plate and the primary spring ring 34. Certain of these springs, as shown in Figure 1 have studs 44 disposed therein and secured to the pressure plate, the free end of the studs carrying a nut 45 which engages the back or right side of the primary spring ring 33. These studs are provided to secure parallelism of the pressure plate relative to the clutch disc and flywheel, and may also be utilized to control running clearances, while the pressure springs are so designed as to obtain an initial pre-loading to the desired total pressure. Thus if the centrifugal weights and the studs 44 were omitted a fully operative manual release clutch would result as the pressure springs are loaded to the desired engaging pressure to carry the designed torque. With the addition of the centrifugal weights and studs the clutch becomes automatic in action although the pressure is limited to that of the equivalent manual clutch no matter how great the centrifugal force becomes at high rotative speeds since the weights swing out against the housing and transmit any excess forces directly thereto without further effect on the automatic operation or manual release of the clutch.

The clutch is so proportioned that engagement occurs in two stages, the first stage involving the movement of the pressure plate and primary spring ring to the left as a unit without further compressing the pressure springs at a rotative speed corresponding to the adjustment of the retractor springs. During this stage the clutch running clearances are taken up and an initial light engagement of the clutch accomplished due to a partial outward movement of the primary centrifugal weights against the resistance of the retractor springs. The partial clutch engagement so accomplished serves to gradually pick up a load and a further increase of engine speed, after the clutch clearances have been so taken up, serves to energize the secondary centrifugal weights against the resistance of the secondary retractor springs to move the secondary spring ring 35 to the left. Up to this point while the pressure springs remain unaltered in length yet in practice the pressure developed by the leverage of the weights is sufficient to carry normal torque. A further increase in rotative speed causes the both sets of weights to swing out against the housing, shifting both spring rings further to the left into the position of Figures 4 to 6 where the pre-loading of the pressure springs is transferred from the studs 44 to the pressure plate to secure the full designed engaging pressure, which is sufficient to assure against slippage under abnormal conditions.

While the illustrated clutch closely resembles a conventional type of manually controlled clutch, and may have the same characteristics of clutch pressure and throwout mechanism, it differs therefrom in that it is automatically and smoothly engaged through a predetermined range of rotative speeds by means of centrifugal force which swings the two sets of weights outwardly from the position of Figure 1 into contact with the housing causing a movement of the spring rings to the left in the figures, towards the flywheel and clutch disc. The spring rings are normally held in the position of Figure 1 by the retractor springs and the spring rings in turn normally hold the pressure plate in fixed relationship wherein the pressure springs are compressed to a desirable initial pre-loading by means of the studs 44 and nuts 45.

From the foregoing description it will be evident that the clutch can be thrown out by the usual foot operated mechanism at engine speeds above the point where the clutch engages automatically, and that the load on the pedal required for making this release need not exceed that in an equivalent conventional clutch of the same capacity since in both types, the clutch throwout works against pressure springs the pre-loading of which determines the clutch capacity.

The foregoing clutch structure is more fully disclosed in my before-mentioned copending application and the present invention will be described in connection therewith since it relates to means for manually engaging an automatic clutch when the engine is dead and the normal clutch engaging mechanism is thus inoperative due to lack of centrifugal force for energizing the same. This invention is therefore to be understood to be capable of use with a wide range of designs of automatic clutches which automatically release when the driving member drops below a predetermined rotative speed.

The spaced pairs of throwout fingers 26 carry cams 46 pivoted at 47 between the levers, the cams being pulled upwardly on the figures by springs 48 hooked over pins 49 near the free ends of the levers. The cams or weights 46 are so positioned as to be thrown outwardly into the position of Figures 3 to 6 by the action of centrifugal force thereon when the clutch members are rotating above a predetermined speed. Should the rotative speed of the normally driving elements drop beneath that speed required to produce sufficient centrifugal force to overcome the tension of the springs 48, then the springs pull the cams inwardly towards the clutch axis and the cam surface of the cams ride up on a mating surface 50 on the pressure plate thus locking the throwout fingers against pivotal movement. The cam surface is of increasing radius towards the toe so that as clutch clearances increase the cam moves farther inward in turn causing the free end of the throwout fingers to move further to the right as wear occurs in the clutch.

The pairs of throwout fingers with their assembled cams and springs are so proportioned as to have a center of gravity to the left of the pivot pin so that when the clutch is rotating the action of centrifugal force on the levers will tend to throw them to the left and away from the throwout bearing to prevent dragging and scuffing of the fingers on the throwout bearing while the driving parts of the clutch are rotating. This action tends to seat the nuts 30 against the housing but when the driving parts of the clutch come to rest, the spring 31 pushes the nut 30 and eye bolt to the right as in Figure 1, thus pulling the throwout fingers over to the right into contact with the throwout bearing. At the same time, under these circumstances the cams 46 swing up to contact the pressure plate at 50 thus locking the throwout fingers against pivotal movement. In this position, shown in Figure 1, the operation of the usual clutch pedal in the normal manner will cause clutch engagement by pushing the then rigid fingers 26 and the pressure plate to the left. When the engine is rotating however, the cams 46 are thrown out into the position of Figures 3 to 6 and if the clutch is engaged, a normal operation of the clutch pedal will then act through the throwout fingers to retract the pressure plate. Thus my invention utilizes the usual clutch pedal control both to disengage the clutch at will while the engine is rotating and to cause clutch engagement when the engine has stopped.

It will thus be seen that I have invented an improved automatic clutch structure that has been subordinated to the will of the operator both for engaging and disengaging the same regardless of the operation of the engine or of the automatic features of the clutch.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The combination with a normally disengaged clutch embodying relatively movable coacting friction members, of centrifugal means for moving said members into clutching engagement upon one of the members attaining a predetermined speed of rotation, manual means for controlling the disengagement of said members when engaged by said centrifugal means and centrifugally controlled means adapted to be automatically interposed in the manual means to cause manual engagement of said members by the normal disengaging movement of said manual means when said members are not rotating.

2. The combination with an automatic clutch embodying relatively movable coacting friction members and means responsive to the rotative speed of the driving member for moving said members into engagement above a predetermined rotative speed, manual means for disengaging said members when automatically engaged, and means adapted to be automatically interposed in the manual means upon stoppage of the driving member whereby to cause engagement of said members by the normal disengaging movement of said manual means when the driving member has stopped.

3. The combination with an automatic clutch embodying relatively movable coacting friction members and means responsive to the rotative speed of the driving member for moving said members into engagement above a predetermined rotative speed, manual means for disengaging said members, and means adapted to be automatically interposed in the manual means upon stoppage of the driving member whereby to permit engagement of said members by said manual means when the driving member has stopped, said means including a centrifugally responsive member thrown out of engaging position above a predetermined rotative speed of the driving member.

4. The combination with an automatic clutch embodying relatively movable coacting friction members and means responsive to the rotative speed of the driving member for moving said members into engagement above a predetermined rotative speed, manual means for disengaging said members, and centrifugally responsive means adapted to be automatically interposed in the manual means upon stoppage of the driving member whereby to permit engagement of said members by said manual means when the driving member has stopped, said means being rendered inoperative by centrifugal force above a predetermined rotative speed.

5. The combination with an automatic clutch embodying relatively movable coacting friction members and means responsive to the rotative speed of the driving member for moving said members into engagement above a predetermined rotative speed, manual means for disengaging said members, and means interposable between one of said coacting friction members and the manual means for disengaging the clutch members, whereby said manual means is adapted to be used to engage the clutch.

6. The combination with an automatic clutch embodying relatively movable coacting friction members and means responsive to the rotative speed of the driving member for moving said members into engagement above a predetermined rotative speed, manual means for disengaging said members, and means interposable between said coacting friction members and the manual means for disengaging the clutch members, whereby said manual means is adapted to be used to engage the clutch, said means being normally disposed in operative position when the driving member has stopped and being centrifugally unbalanced whereby to be thrown out of operative position when the driving member is rotating.

7. In combination an automatic clutch comprising driving and driven members, clutch engaging means comprising centrifugally responsive means for engaging the driving and driven members, and means for manually disengaging said driving and driven members at will, and means interposable between said driving member and the manual means for disengaging the clutch members, whereby said manual means is adapted to be used to engage the clutch.

8. In combination an automatic clutch comprising driving and driven members, clutch engaging means comprising centrifugally responsive means for engaging the driving and driven members, and means for manually disengaging said driving and driven members at will, and means interposable between said driving member and the manual means for disengaging the clutch members, whereby said manual means is adapted to be used to engage the clutch, said means being normally disposed in operative position when the driving member has stopped, and being centrifugally unbalanced whereby to be thrown out of operative position when the driving member is rotating.

9. In combination an automatic clutch comprising driving and driven members, clutch engaging means comprising centrifugally responsive means for engaging the driving and driven members, and means for manually retracting said driving member at will, and centrifugally responsive means adapted to be automatically interposed between the manual means and the driving member for reversing the direction of movement of the driving member in response to operation of the manual means whereby to then permit engagement of said members by said means for normally manually retracting the driving member.

10. In a clutch comprising driving and driven members, the driving member including a pressure plate movable towards and away from the driven member to obtain engagement and disengagement, means for manually retracting the pressure plate at will including throwout fingers normally pivoted with respect to the pressure plate whereby the pivotal movement of the fingers retracts the pressure plate, and means carried by the throwout fingers and adapted to lock the same against pivotal movement when the driving member has stopped, whereby the use of the normal clutch disengaging means then serves to advance the pressure plate into engagement with the driven member.

11. In a clutch comprising driving and driven members, the driving member including a pressure plate movable towards and away from the driven member to obtain engagement and disengagement, means for advancing the pressure plate into engagement with the driven member, means for manually retracting the pressure plate at will including throwout fingers normally pivoted with respect to the pressure plate whereby the pivotal movement of the fingers retracts the pressure plate, and means carried by the throwout fingers and adapted to lock the same against pivotal movement when the driving member has stopped, whereby the use of the normal clutch disengaging means then serves to advance the pressure plate into engagement with the driven member.

12. In a clutch comprising driving and driven members, the driving member including a pressure plate movable towards and away from the driven member to obtain engagement and disengagement, means for manually retracting the pressure plate at will including throwout fingers normally pivoted with respect to the pressure plate whereby the pivotal movement of the fingers retracts the pressure plate, said fingers being unbalanced relative to their pivots and the rotational axis of the clutch whereby centrifugal force is adapted to swing said fingers out of their operative positions, and means carried by the throwout fingers and adapted to lock the same against pivotal movement when the driving member has stopped, whereby the use of the normal clutch disengaging means then serves to advance the pressure plate into engagement with the driven member.

13. The combination with a clutch automatically engageable and disengageable respectively above and below a predetermined rotative speed, and a manually controllable mechanism adapted to disengage the clutch when the latter is automatically engaged, of a speed responsive mechanism adapted to be operatively positioned between the clutch and the manually controllable mechanism to convert the manually controllable mechanism into a clutch engaging mechanism when the rotative speed of the driving member of the clutch drops below a predetermined value.

14. The combination with a clutch automatically engageable and disengageable respectively above and below a predetermined rotative speed, and a manually controllable mechanism adapted to disengage the clutch when the latter is automatically engaged, of speed responsive means rendered inoperative by centrifugal force above a predetermined driving speed, said means being adapted to be operatively positioned between the clutch and the manually controllable mechanism to convert the manually controllable mechanism into a clutch engaging mechanism when the rotative speed of the driving member of the clutch drops below a predetermined value.

15. The combination with a clutch embodying relatively movable coacting friction members, of centrifugal means for moving said members into engagement upon one of the members attaining a predetermined speed of rotation, manual means for normally effecting the disengagement of said members and centrifugally controlled means adapted to be automatically interposed between the manual means and one of said friction members to convert the manual means into a clutch engaging mechanism to permit engagement of said members by said manual means when said members are not rotating.

16. The combination with an automatic clutch embodying relatively movable coacting friction members and means responsive to the rotative speed of the driving member for moving said members into engagement above a predetermined rotative speed, manual means normally adapted for disengaging said members, and means adapted to be automatically interposed between the manual means and one of said members upon stoppage of the driving member whereby to permit engagement of said members by said manual means when the driving member has stopped.

17. The combination with an automatic clutch embodying relatively movable coacting friction members and means responsive to the rotative speed of the driving member for moving said members into engagement above a predetermined rotative speed, manual means for disengaging said members, and means adapted to be automatically interposed between the manual means and one of said members upon stoppage of the driving member whereby to permit engagement of said members by said manual means when the driving member has stopped, said means including a centrifugally responsive member thrown out of engaging position above a predetermined rotative speed of the driving member.

18. The combination with an automatic clutch embodying relatively movable coacting friction members and means responsive to the rotative speed of the driving member for moving said members into engagement above a predetermined rotative speed, manual means for disengaging said members, and centrifugally responsive means adapted to be automatically interposed between the manual means and one of said members upon stoppage of the driving member whereby to permit engagement of said members by said manual means when the driving member has stopped, said means being rendered inoperative by centrifugal force above a predetermined rotative speed.

19. In combination an automatic clutch comprising driving and driven members, clutch engaging means comprising centrifugally responsive means for engaging the driving and driven members, and means for manually disengaging said driving and driven members at will, and centrifugally responsive means adapted to be automatically interposed between the manual means and part of the clutch engaging means thereby to then permit engagement of said members by said means for manually disengaging the members.

HAROLD NUTT.